United States Patent

Peinecke et al.

[11] Patent Number: 6,033,549
[45] Date of Patent: Mar. 7, 2000

[54] METHOD OF ELECTROLYSIS

[75] Inventors: Volker Peinecke; Paul Mohr, both of Stuttgart, Germany

[73] Assignee: Deutsche Forschungsanstalt fuer Luft- und Raumfahrt e.V., Bonn, Germany

[21] Appl. No.: 08/965,225

[22] Filed: Nov. 6, 1997

[30] Foreign Application Priority Data

Nov. 6, 1996 [DE] Germany .......................... 196 45 693

[51] Int. Cl.$^7$ .............................. C25B 15/02; C25C 1/00
[52] U.S. Cl. ............................ 205/335; 205/743; 205/628
[58] Field of Search .................................. 205/628, 633, 205/637, 335, 743

[56] References Cited

U.S. PATENT DOCUMENTS

| | | | |
|---|---|---|---|
| 5,037,518 | 8/1991 | Young et al. ............................ | 204/230 |
| 5,711,865 | 1/1998 | Caesar ...................................... | 205/628 |

FOREIGN PATENT DOCUMENTS

| | | |
|---|---|---|
| 1 592 296 | 12/1970 | Germany . |
| 40 20 722 | 1/1992 | Germany . |

Primary Examiner—Kathryn Gorgos
Assistant Examiner—Wesley A. Nicolas
Attorney, Agent, or Firm—Barry R. Lipsitz; Ralph F. Hoppin

[57] ABSTRACT

In order to provide a method of electrolysis for the electrolysis of water, in which water is decomposed electrolytically from an electrolysis medium and the electrolysis gases hydrogen and oxygen obtained are each separated from the liquid electrolysis medium in a gas separator, wherein a supply of water to balance out the water consumption resulting from the electrolysis is controlled by a determination of an electrolysis medium volume which is determined by the total amount of electrolysis medium in the method of electrolysis, and by means of which the total volume of the electrolysis medium in the plant can be maintained constant, it is proposed that at least one physical quantity which is characteristic of the electrolysis, and whose variation causes a change in the electrolysis medium volume in addition to the change in the electrolysis medium volume resulting from the water consumption, is measured and there is calculated from a deviation of this quantity from a predetermined reference value for this quantity an associated change in the electrolysis medium volume and said calculated change is allowed for in the control of the water supply.

22 Claims, 2 Drawing Sheets

METHOD OF ELECTROLYSIS

The present disclosure relates to the subject matter disclosed in German Application No. 196 45 693.2 of Nov. 6, 1996, the entire specification of which is incorporated herein by reference.

The invention relates to a method of electrolysis for the electrolysis of water, in which water is decomposed electrolytically from an electrolysis medium and the electrolysis gases hydrogen and oxygen obtained are each separated from the liquid electrolysis medium in a gas separator, wherein a supply of water for balancing out or compensating for the water consumption resulting from the electrolysis is controlled by a determination of an electrolysis medium volume which is determined by the total amount of electrolysis medium in the method of electrolysis.

The electrolysis gases hydrogen and oxygen obtained during the electrolysis of water mingle with the electrolysis medium. In the case of an alkaline electrolyzer, the hydrogen or oxygen mingles with the alkaline electrolysis medium, in the case of a membrane electrolyzer with water. In order to separate the gaseous hydrogen or oxygen from these two-phase mixtures, the latter are fed to a hydrogen gas separator or an oxygen gas separator.

In a further method known from the prior art for the feeding in of water for balancing out the water consumption resulting from the electrolysis, the filling level of electrolysis medium is determined in a gas separator, i.e. either a hydrogen gas separator or an oxygen gas separator, wherein hydrogen and oxygen gas separators are connected according to the communicating tubes principle, and water is fed in in such a way that said filling level is kept and remains constant. Problems can thereby arise, however, because as a result of such a control the total volume of electrolysis medium, i.e. the amount of electrolysis medium which is located in the electrolyzer, the gas separators and lines between the electrolyzer and the gas separators, can also vary, despite the fact that the filling level in a gas separator is maintained constant.

The invention is therefore based on the problem of providing a method of the kind according to the preamble by means of which the total volume of the electrolysis medium in the plant can be maintained constant.

This problem is solved according to the invention with a method of the kind described in the preamble by the fact that at least one physical quantity which is characteristic of the electrolysis and whose variation causes a change in the electrolysis medium volume in addition to the change in the electrolysis medium volume resulting from the water consumption is measured and there is calculated from a deviation of this quantity from a predetermined reference value for this quantity an associated change in the electrolysis medium volume and said calculated change is allowed for in the control of the water supply.

In the method known according to the prior art the gas separators used have to be of very large construction in order that the latter can accommodate a large amount of electrolysis medium, so that variations in the external conditions, such as for example fluctuations in the electrolytic current or temperature fluctuations of the electrolysis medium or fluctuations in the pressure to which the electrolysis medium is subjected, do not have a great influence. The gas separators required for this lead, however, to high building costs. In addition, the space occupied by an electrolysis plant is large because of the size of such gas separators. The plant reaches its target temperature, at which the best energy conversion efficiency is achieved, more slowly, since a large amount of electrolysis medium has to be heated up.

The hydrogen obtained during the electrolysis is always contaminated with some oxygen and the oxygen with some hydrogen. These mixtures have to be monitored constantly to ensure that their gas composition lies below the lower explosion limit. If the region of the lower explosion limit is approached, the plant has to be shut down. In the case of gas separators of large proportions it can take a long time before gas mixtures of poor quality are detected.

In addition, a worsening of the energy conversion efficiency of the electrolysis can occur, due to the fact that the total volume of the electrolysis medium is not maintained constant in the known method, but only the filling level in a gas separator. The electrolysis medium can be diluted excessively as a result, for example if too much water is fed in.

Nitrogen is injected into an electrolysis plant for the purpose of rendering it inert. This may be necessary in particular if breakdowns occur, in order to prevent the formation of a combustible hydrogen-oxygen mixture. More nitrogen has to be injected in the case of a large-sized plant and the rendering inert requires more time than with a smaller-sized plant.

By making allowance in the method according to the invention for physical processes which change the electrolysis medium volume in addition to the water consumption resulting from the electrolysis, the total volume of electrolysis medium can be maintained constant, and the gas separators can thereby be of smaller size and hence be built more cheaply. Since in each case only that amount of water which is actually consumed is fed in, the concentration of the electrolysis medium is maintained at a constant concentration optimum for the conversion of energy. The mass of electrolysis medium volume in the plant can be reduced compared with traditional plants, so that the target temperature, at which an optimum energy conversion efficiency for the electrolysis is achieved, is adjustable more rapidly. The operational safety of the plant is enhanced, since a poor gas quality, from which the risk of an explosion arises, can be recognized at an early stage. The rendering inert of the plant with nitrogen is possible more quickly, and less gas is required.

Fluctuations in the electrolytic current, which can arise, for example, from clouding over during solar current generation, cause fluctuations of the gas production in the electrolyzer. In the case of high gas production, in particular, a larger amount of electrolysis medium is pressed into the gas separators by the electrolyzer. It is then particularly advantageous if the electrolytic current, which brings about the electrolysis, is measured in order to control the water fed in.

The gas bubble volume in the electrolysis unit, and hence the electrolysis medium volume in a gas separator, is changed by a variation in the pressure to which the electrolysis medium is subjected. It is therefore particularly advantageous if, in order to control the water fed in, the pressure to which the electrolysis medium is subjected is measured.

It is particularly beneficial if the temperature of the electrolysis medium is measured, since a temperature change can result in a volume expansion of the electrolysis medium liquid.

In an advantageous embodiment of the method according to the invention the water supply is controlled in such a way that a controlled variable for the electrolysis medium volume lies between an upper and a lower target value. It is thereby ensured that the total amount of electrolysis medium lies within an optimum range.

With advantage the controlled variable for the electrolysis medium volume is determined from a base quantity, which is obtained by measuring one or more quantities determined by the total amount of electrolysis medium, and a change quantity, wherein the change quantity is calculated with the aid of at least one measured physical quantity whose variation with regard to associated reference values changes the electrolysis medium volume in addition to its change due to electrolytic water decomposition. It is possible in this way to determine the controlled variable from a base quantity, which is determinable directly from a measurement, and the calculated change quantity.

In a variant of an embodiment of the method according to the invention the change quantity is determined from the measured values for the physical quantities with the aid of tabulated values. The change quantity can in this way be determined very rapidly from the measurement of some easily measurable physical parameters, in particular the temperature of the electrolysis medium, the pressure to which the electrolysis medium is subjected, and the electrolytic current.

The tabulated values are determined for calibration by at least one physical quantity, whose variation causes a change in the electrolysis medium volume in addition to the electrolytic water decomposition, being varied in a defined way compared with an associated predetermined reference quantity. It follows from this that the behaviour of an electrolysis plant for the electrolysis of water can be determined through variations of the characterizing physical quantities, so that when these parameters are changed the possibility of an exact control of the water fed in is provided during the operation of the plant.

In a beneficial manner the electrolytic current which brings about the electrolysis is varied in a defined way for the calibration.

It is also beneficial if the pressure to which the electrolysis medium is subjected is varied in a defined way for the calibration.

It is also provided that the temperature of the electrolysis medium is varied in a defined way for the calibration.

No further details concerning the determination of the basis quantity have been given to date.

In a variant of an embodiment there is selected as base quantity an electrolysis medium filling level either in a hydrogen gas separator or in an oxygen gas separator, wherein hydrogen gas separator and oxygen gas separator are connected to one another according to the communicating tubes principle. The basis quantity is thereby measurable directly in a simple manner.

It is particularly beneficial if the arithmetic mean of the electrolysis medium filling level in the oxygen gas separator and in the hydrogen gas separator is selected as base quantity. Differential pressures between the oxygen in the oxygen gas separator and the hydrogen in the hydrogen gas separator can be levelled out or compensated mathematically in this way.

No statements have been made so far to date concerning an individual oxygen or hydrogen gas separator.

It is advantageous if the pressure or filling level in the hydrogen gas separator and the pressure or filling level in the oxygen gas separator are controlled. It is thereby ensured that an excessively high differential pressure cannot form between the hydrogen gas separator and the oxygen gas separator, something which could for example have a harmful effect on membranes or diaphragms in the electrolysis unit, which are used particularly with alkaline electrolytes.

It is particularly advantageous if a target value of zero is selected for the pressure difference between the hydrogen gas separator and the oxygen gas separator, so that the hydrogen gas separator and the oxygen gas separator have the same filling level.

It is further advantageous for the control if the target for the pressure in the hydrogen gas separator and the oxygen gas separator lies between a maximum design pressure and a minimum operating pressure. It is therefore ensured at all times that a particular safety pressure is not exceeded and a minimum pressure is present, so that the gas separator unit can still deliver hydrogen or oxygen.

In a variant of an embodiment of the method according to the invention the pressure in a gas separator and the filling level difference between the hydrogen and the oxygen gas separator are the control quantities, since the filling level difference or difference in contents, in particular can be measured in a simple manner.

The pressure or filling level in a gas separator is controlled in a particularly simple manner structurally by means of control valves.

Continuous control valves can be provided as control valves, by means of which a continuous control of pressure or filling level is permitted.

Alternatively to this, discontinuous control valves can be provided as control valves, for example solenoid valves.

The filling level in the hydrogen gas separator and the filling level in the oxygen gas separator can be determined in each case in a particularly simple manner by means of a filling level sensor.

The pressure of the hydrogen gas in the hydrogen gas separator and the pressure of the oxygen gas in the oxygen gas separator is determined with advantage in each case by means of a pressure sensor.

Figure 1:
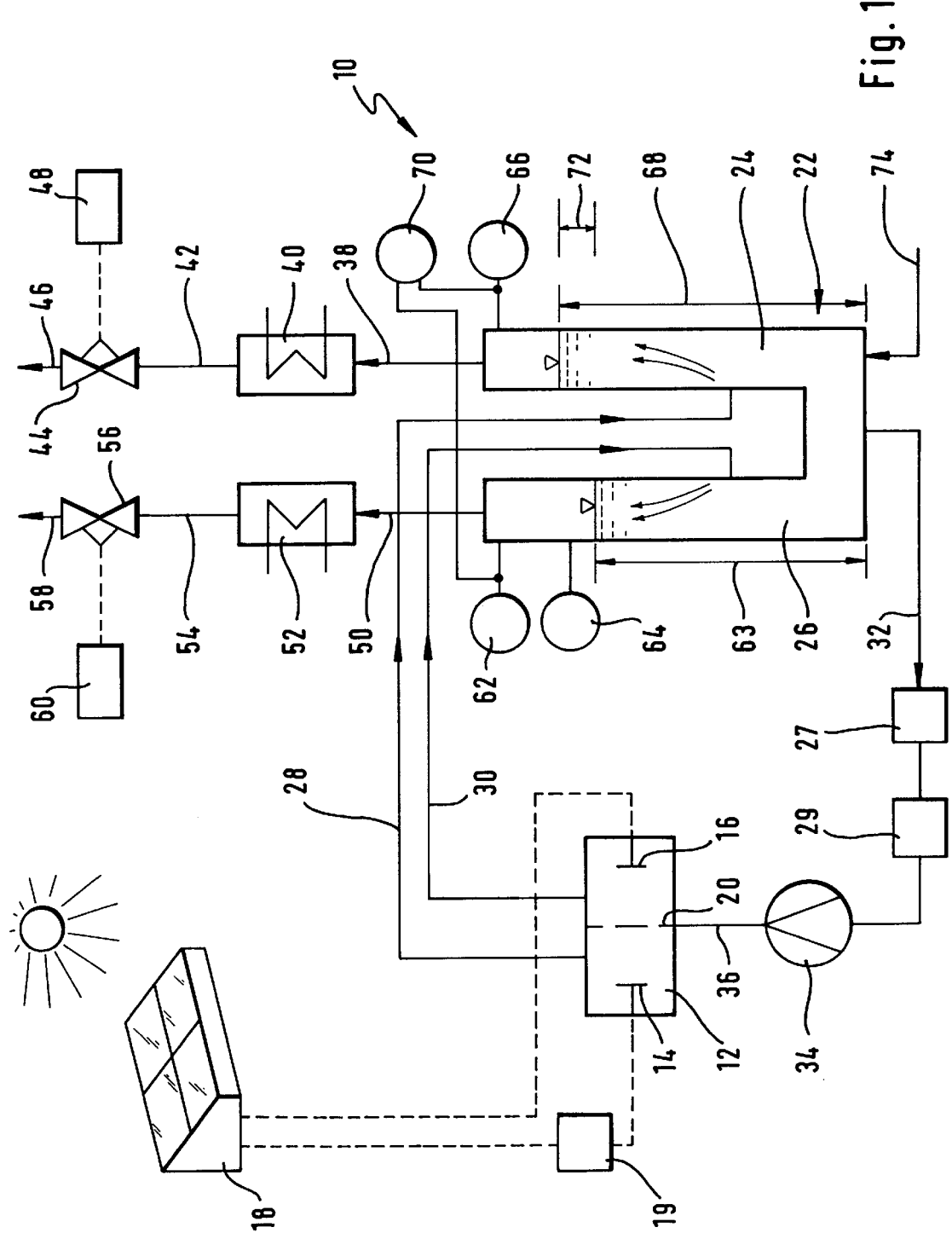
FIG. 1 shows an embodiment of a plant for the electrolysis of water.

An embodiment of a plant for the electrolysis of water, which is designated as a whole by 10, is shown in FIG. 1. The plant 10 incorporates an electrolysis unit 12, which is composed of one or more electrolytic cells. An electrolytic cell comprises a hydrogen cathode 14 and an oxygen anode 16. The hydrogen cathode 14 and the oxygen anode 16 are connected to a unit 18 for the generation of electrical energy. For example, a solar power plant, a wind power plant or a water power plant can be involved, in which the electrolysis current required for the electrolysis of water is generated. A sensor 19, which is arranged in the current feed line from the unit 18 to the electrolysis unit 12, measures the electrolysis current.

An electrolysis medium is present in each electrolytic cell. For the electrolysis of water preferably an alkaline electrolyte with good conductivity is used as electrolysis medium. Each electrolytic cell comprises a membrane 20 which prevents hydrogen gas and oxygen gas formed in the electrolytic cell during the electrolysis from mixing, wherein the ion transport in the electrolytic cell remains guaranteed by the membrane.

The plant 10 comprises further a gas separator unit 22 which is formed from a hydrogen gas separator 24 and an oxygen gas separator 26. The hydrogen gas separator 24 and the oxygen gas separator 26 are connected to one another according to the communicating tubes principle.

From an electrolytic cell a line 28 leads from the hydrogen cathode side of the electrolytic cell to the hydrogen gas separator 24 and from the oxygen anode side 16 of the electrolytic cell a line 30 leads to the oxygen gas separator 26. Electrolysis medium containing gaseous hydrogen formed during the water electrolysis is fed to the gas separator unit 22 through the line 28 and electrolysis medium containing oxygen formed during the electrolysis is fed to the gas separator unit 22 through the line 30.

From the gas separator unit 22 a line 32, which serves for the return of electrolysis medium from the gas separator unit 22 to the electrolysis unit 12, leads to an inlet side of a pump 34. From an outlet side of the pump 34 a line 36 leads to the electrolysis unit 12. The pump 34 effects the transport of the electrolysis medium from the electrolysis unit 12 to the gas separator unit 22 and from the gas separator unit 22 back into the electrolysis unit 12. A sensor 27, which can be arranged for example in the line 32, can be provided, which measures the pressure in the electrolysis medium. A temperature sensor 29, which can likewise be arranged in the line 32, measures the temperature of the electrolysis medium.

In the oxygen gas separator 26 and in the hydrogen gas separator 24 of the gas separator unit 22 the electrolysis gases oxygen and hydrogen formed during the water electrolysis are separated from the liquid electrolysis medium. The hydrogen gas separator 24 comprises for this purpose in the vicinity of its upper end a line 38, through which hydrogen can be withdrawn from the gas separator unit. The separated hydrogen is fed to a gas cooler 40 for drying. An outlet side of the gas cooler 40 is connected via a line 42 to an inlet of a control valve 44. From an outlet of the control valve 44 a line 46 leads to a device in which the separated hydrogen is further treated.

The amount of hydrogen that is separated out of the hydrogen gas separator 24 is controlled by means of the control valve 44 and the pressure of the hydrogen in the hydrogen gas separator 24 is controlled in this way. A controller 48, for example a PID controller, controls the control valve 44.

A line 50 leads from an upper end of the oxygen gas separator 26 to a gas cooler 52. From the gas cooler 52, which serves for the drying of the oxygen, a line 54 leads to an inlet of a control valve 56. From an outlet of the control valve 56 a line 58 leads to a device by means of which the separated oxygen gas is further treated. A controller 60, which can be for example a PID controller, controls via the control valve 56 the amount of oxygen that can be withdrawn and hence the oxygen pressure in the oxygen gas separator 26.

The oxygen gas separator 26 comprises a filling level sensor 62, by means of which the level 63 of electrolysis medium in the oxygen gas separator 26 can be determined.

A pressure sensor 64 determines the pressure of the oxygen which is located in the upper part of the oxygen gas separator 26 and passes this value to the controller 60, wherein said signal serves as actual value for the controller. The value determined by said pressure sensor 64 also serves as a measure of the system pressure in the electrolysis plant.

A filling level sensor 66 determines the level 68 of electrolysis medium in the hydrogen gas separator 24.

A difference determiner 70, which is connected to the filling level sensors 66 and 62, determines the differential level 72 between an electrolysis medium level 68 in the hydrogen gas separator 24 and the electrolysis medium level 63 in the oxygen gas separator 26 and passes said signal to the controller 48, which uses it as an actual value.

Through a water feed line 74, which leads into a lower part of the gas separator unit 22, water is fed into the plant 10 in order to balance out the water consumption which occurs as a result of the electrolytic decomposition of water.

The feeding of water through the line 74 into the electrolysis plant 10 is controlled by a control unit (not shown in the figure). For this the control unit records the level 63 in the oxygen gas separator 26 and the level 68 in the hydrogen gas separator 24. There is also recorded by the control unit the temperature T in the electrolysis medium by means of the temperature sensor 29, the electrolytic current I by means of the current sensor 19 and the pressure p in the electrolysis plant by means of the pressure sensor 64 or by means of the pressure sensor 27.

The method for controlling the charging of water into the plant 10 operates as follows:

For calibrating the plant 10 calibrating data are determined, which are used to control the water fed in during the operation of the plant 10. For this the mean filling level $H_m$, which represents the arithmetic mean of the levels 63 and 68, is set to an optimum value for the plant 10 for a selected operating electrolytic current $I_o$, an operating temperature $T_o$ in the electrolysis medium and an operating pressure $p_o$ in the electrolysis medium. The temperature T is then varied in a defined way compared with the reference value $T_o$, wherein the electrolytic current I and the pressure p in the electrolysis medium are maintained constant, and the change $\Delta h_T$ in the mean filling level is determined and the corresponding data stored.

In a similar manner the quantity $\Delta h_I$ is determined by maintaining the temperature T and the pressure p constant and by varying the electrolytic current I compared with the reference value $I_o$.

The quantity $\Delta h_p$ is obtained by determining the change in the mean filling level when the pressure p is varied in a defined way compared with the reference value $p_o$ and the temperature T and the electrolytic current I are maintained constant.

In this way calibration values are obtained which characterize the change in the mean filling level when the electrolytic current I, the temperature T in the electrolysis medium or the pressure p in the electrolysis medium changes compared with the predetermined reference values.

Figure 2:
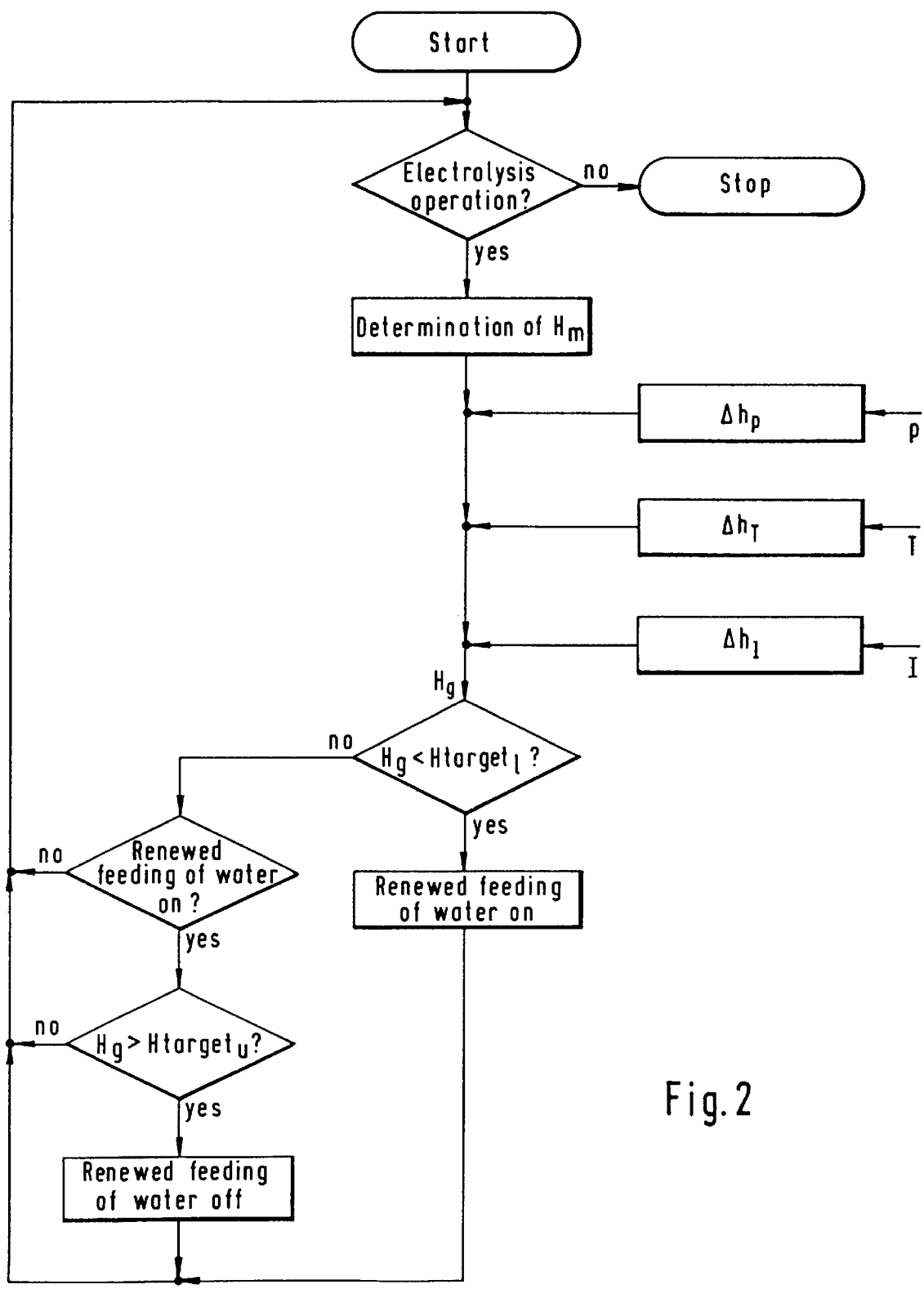
FIG. 2 a flow chart of an embodiment of a method for the feeding of water into a plant for the electrolysis of water.

During the electrolytic operation of the plant 10 the control of the water fed in takes place in such a way that, as shown in FIG. 2, the arithmetic mean $H_m$ of the filling level 63 in the oxygen gas separator 26 and the level 68 in the hydrogen gas separator 24 is determined. The control unit records the pressure p in the electrolysis medium, the temperature T in the electrolysis medium and the electrolytic current I. There is then calculated from this, with the aid of the data determined during the calibration process, a change in the mean filling level based on a deviation of the pressure p in the electrolyte from a specified initial value, the deviation of the temperature T from a specified initial value and the deviation of the electrolytic current I from its specific initial value. Said change $\Delta = \Delta h_p + \Delta h_T + \Delta h_I$ is subtracted from the mean filling level $H_m$ and yields a controlled variable $H_g$.

If the controlled variable $H_g$ lies below a predetermined lower target or desired value $Htarget_l$, the renewed feeding of water through the line 74 into the gas separator unit 22 is started. Thereupon the arithmetic mean of the filling levels in the oxygen gas separator 26 and the hydrogen gas separator 24 is determined and the procedure just described followed.

If the controlled variable $H_g$ is greater than the lower target value, it is checked whether the renewed feeding of water through the line 74 has been started. If this is not the case, the arithmetic mean of the filling levels in the gas separator unit 22 is determined and the procedure described above then followed.

If on the other hand the renewed feeding of water has been started, the control unit then checks whether the controlled variable $H_g$ is greater than a predetermined upper or desired target value $Htarget_u$. If this is not the case, the mean filling level is determined once again and the procedure described above is followed.

If the checking shows that the controlled variable $H_g$ has already exceeded the upper target value, the renewed feeding of water is switched off. The next step is then once again the determination of the mean filling level in the gas separator unit 22.

It can also be provided that in an independent control loop the pressure of the oxygen gas in the oxygen gas separator 26 and the pressure of the hydrogen gas in the hydrogen gas separator 24 is controlled in such a way that there is no pressure difference between the two gas separators and hence the electrolysis medium filling level 63 in the oxygen gas separator and the electrolysis medium level 68 in the hydrogen gas separator 24 lie at the same level.

In a variant of an embodiment the oxygen pressure in the oxygen gas separator 26 is for this purpose controlled via the controller 60, which controls the amount of oxygen separated by the gas separator unit 22, and the filling level difference between the hydrogen gas separator 24 and the oxygen gas separator 25 is controlled via the controller 48, which controls the amount of hydrogen gas separated out of the gas separator unit 22 via the control valve 44. The target value for this control is such that the filling level difference 72 and hence the pressure difference between the oxygen gas separator 26 and the hydrogen gas separator 24 comes to zero.

The target value for the oxygen pressure in the oxygen gas separator 26 and the target value for the hydrogen pressure in the hydrogen gas separator 24 lies between an upper maximum design pressure for the plant 10 and a lower pressure which is characterized by the fact that the control valve 56 or 44 can still just deliver gas.

An exact control of the pressures or the filling levels in the gas separator unit 22 can be achieved by the control valves 56 and 44 being constructed as continuous control valves. It can also be provided, however, that the control valves 56 and 44 are constructed as discontinuous control valves.

We claim:

1. A method for the electrolysis of water, in which water is decomposed electrolytically from an electrolysis medium and the electrolysis gases hydrogen and oxygen obtained are each separated from the liquid electrolysis medium in a gas separator, comprising the steps of:
   controlling a supply of water for balancing out the water consumption resulting from the electrolysis by determining during electrolysis an electrolysis medium volume from a total amount of electrolysis medium,
   measuring at least one physical quantity which is characteristic of the electrolysis, a variation in said physical quantity causing a change in the electrolysis medium volume in addition to and independent of the change in the electrolysis medium volume resulting from the water consumption,
   using a deviation of the measured quantity from a predetermined reference value to calculate an associated change in the electrolysis medium volume, and
   accounting for said calculated change in the control of the water supply, wherein water is added as required.

2. A method according to claim 1, wherein the at least one physical quantity measured during said measuring step comprises an electrolytic current which brings about the electrolysis.

3. A method according to claim 1, wherein the at least one physical quantity measured during said measuring step comprises a pressure to which the electrolysis medium is subjected.

4. A method according to claim 1, wherein the at least one physical quantity measured during said measuring step comprises a temperature of the electrolysis medium.

5. A method according to claim 1, wherein the water supply is controlled in such a way that a controlled variable for the electrolysis medium volume lies between an upper and a lower target value.

6. A method according to claim 5, wherein the controlled variable for the electrolysis medium volume is obtained from:
   a base quantity, which is determined by measurement of one or more quantities determined by the total amount of electrolysis medium, and
   a change quantity, which is calculated with the aid of at least one measured physical quantity, whose variations with regard to associated reference quantities change the electrolysis medium volume in addition to its change resulting from electrolytic water decomposition.

7. A method according to claim 6, wherein the change quantity is calculated from the measured values for the physical quantities with the aid of tabulated values.

8. A method according to claim 7, wherein the tabulated values are determined for calibration by at least one physical quantity, whose variation causes a change in the electrolysis medium volume in addition to the electrolytic water decomposition, being varied in a defined way compared with an associated predetermined reference quantity.

9. A method according to claim 8, wherein the electrolytic current which brings about the electrolysis is varied in a defined way.

10. A method according to claim 8, wherein the pressure to which the electrolysis medium is subjected is varied in a defined way.

11. A method according to claim 8, wherein the temperature of the electrolysis medium is varied in a defined way.

12. A method according to claim 6, wherein:
   the base quantity comprises an electrolysis medium filling level in a hydrogen gas separator or an electrolysis medium filling level in an oxygen gas separator, and
   the hydrogen gas separator and oxygen gas separator are connected to one another according to the communicating tubes principle.

13. A method according to claim 6, wherein the arithmetic mean of the electrolysis medium filling level in an oxygen gas separator and in a hydrogen gas separator is used as the base quantity.

14. A method according to claim 12, wherein the pressure or filling level in the hydrogen gas separator and the pressure or filling level in the oxygen gas separator is controlled.

15. A method according to claim 14, wherein a target value of zero is selected for the pressure difference between the hydrogen gas separator and the oxygen gas separator.

16. A method according to claim 14, wherein the target value for the pressure in the hydrogen gas separator and the oxygen gas separator lies between a maximum design pressure and a minimum operating pressure.

17. A method according to claim 12, wherein the pressure in the hydrogen gas separator or the oxygen gas separator and the filling level difference between the hydrogen gas separator and the oxygen gas separator are the control values.

18. A method according to claim 10, wherein the pressure or filling level in a gas separator is controlled by means of control valves.

19. A method according to claim 18, wherein continuous control valves are provided as control valves.

20. A method according to claim 18, wherein discontinuous control valves are provided as control valves.

21. A method according to claim 1, wherein the filling level in a hydrogen gas separator and the filling level in an oxygen gas separator is determined in each case by a filling level sensor.

22. A method according to claim 1, wherein the pressure of the hydrogen gas in a hydrogen gas separator and the pressure of the oxygen gas in an oxygen gas separator is determined in each case by a pressure sensor.

* * * * *